(12) United States Patent
Knott

(10) Patent No.: US 6,882,296 B2
(45) Date of Patent: Apr. 19, 2005

(54) METHOD OF ENCODING A DIGITAL DATA STREAM

(75) Inventor: John Knott, Court Farm, Henton, Somerset, BA5 1PD (GB)

(73) Assignees: John Knott, Somerset (GB); Terence Ivan Mason, Somerset (GB)

( * ) Notice: Subject to any disclaimer, the term of this patent is extended or adjusted under 35 U.S.C. 154(b) by 0 days.

(21) Appl. No.: 10/701,640

(22) Filed: Nov. 6, 2003

(65) Prior Publication Data

US 2004/0174277 A1 Sep. 9, 2004

(30) Foreign Application Priority Data

Mar. 6, 2003 (GB) .............................. 0305128

(51) Int. Cl.[7] .............................................. H03M 1/36
(52) U.S. Cl. ........................ 341/160; 375/244; 375/242
(58) Field of Search ................................ 341/160, 155, 341/143, 76; 375/237, 244, 242

(56) References Cited

U.S. PATENT DOCUMENTS

| | | | |
|---|---|---|---|
| 4,358,845 A | 11/1982 | de Passoz | .................... 370/44 |
| 5,014,270 A | 5/1991 | Sillere | ........................ 370/101 |
| 6,037,884 A | 3/2000 | Thornton | ...................... 341/53 |
| 6,559,788 B1 * | 5/2003 | Murphy | ...................... 341/164 |

FOREIGN PATENT DOCUMENTS

WO      WO 02/37723      11/2001      ............. H04J/3/00

* cited by examiner

*Primary Examiner*—Peguy JeanPierre
(74) *Attorney, Agent, or Firm*—Bacon & Thomas, PLLC

(57) ABSTRACT

A method of encoding a digital data stream which comprises providing a first stream of clock pulses at a first rate; deriving a second stream of clock pulses from the first stream at a second rate which is an integer sub-multiple of the first rate and less than the minimum bit rate in the data stream; monitoring the data stream for changes in level therein; counting pulses in the first stream starting with the occurrence of a pulse in the second stream; capturing the pulse count when a change in level in the data stream is detected or when the next pulse in the second stream of clock pulses occurs; and upon the occurrence of this pulse in the second stream producing a time domain descriptor of the data by combining the count obtained with information as to the direction of the change in level in the data input stream.

9 Claims, 7 Drawing Sheets

METHOD OF ENCODING A DIGITAL DATA STREAM

FIELD OF THE INVENTION

This invention concerns data recording and particularly the recording of multiple PCM telemetry data streams.

BACKGROUND TO THE INVENTION

The recording of telemetry data streams transmitted via radio links from remote sensors is carried out for various purposes by utilities and government agencies. These streams can be in analogue form, in which information is encoded by modulation of a carrier, or by frequency shift keying (FSK), in which the data is used to change the frequency of a carrier.

The remote sensors generating such data streams often send data at rates which vary slightly from one sensor to another (plesio synchronous).

Recording data from a number of sensors, often including both analogue and digital data, requires preservation of the phase relationship between the sensor data streams whatever method of recording is used.

Traditionally, data streams from remote sensors have been recorded on longitudinal multi-track instrumentation recorders with each sensor assigned its own track. Typically these recorders have been configured with each track having associated electronics optimised for either analogue or digital data streams. Clearly an analogue sensor must be assigned to a track which has been optimised for analogue recording. Digital streams, however, have traditionally been recorded by generating an analogue representation of their current state as either a high or low voltage level.

There are advantages in recording digital as opposed to analogue data streams due to digital recorders generally being relatively low cost, requiring minimal or no maintenance or calibration, and the ease in which recorded data can be transferred from them into computers for analysis. However, as the above requirements for recording digital data streams indicate, it is not a simple task to make a digital plug-compatible equivalent of the above longitudinal multi-track instrumentation recorders.

One reason for this is that the output from a receiver of frequency shift keyed signals is just data, the clock required to process the data digitally not being available. In theory a clock can be regenerated from the data, but if the phase lock loop usually used by clock recovery devices is disturbed by noise, extra or missing clock transitions will be produced, and this will usually spoil the phase accuracy of this channel from then on. If the clock recovery device is only used during replay, a disturbance during replay may be overcome by repeating the replay. However, if the disturbance occurred during recording of the data, the data becomes irreparably damaged.

Instrumentation recorders do not need a clock and hence cannot suffer from these problems.

Since data from a plurality of digital sensors is generally plesio synchronous, complex packaging systems are required in order to record them and then make sense of the recorded data. One technique for effecting this is to accumulate data into packets of a size sufficient to accommodate the output of the fastest sensor. In writing the packets to a particular recording channel, a count of the actual content of the packet is appended to it, and this package count is used during replay to return only valid data. This data is usually stripped on a first in first out basis at a rate controlled by a variable oscillator, the oscillator being trimmed to keep the first in first out pointers constant. However, this introduces small phase errors. In addition it suffers with the problems associated with the clock recovery devices referred to above.

Direct digital recording could be effected by attempting to emulate a multi-track instrumentation recorder, received frequency shift keyed data being treated as an analogue signal and digitising it. In theory a 250 kilobit stream of pulses can be treated as being equivalent to an analogue signal with a frequency of 125 kHz, this being the frequency a 1010 sequence would produce. Sampling theory suggests that this stream could be sampled by 250 kilo samples. However, in practice a sampling rate of 125 kHz×2.5 would be required using anti-alias filters. Furthermore, such filters have the disadvantage that they impose a limit on the rate of change of originally sharp transitions, resulting inevitably in ringing caused by these sharp transitions.

It is also debatable as to whether clock recovery devices used with conventional instrumentation recorders will function correctly with the resulting degraded waveforms, thereby calling into question the ability to provide true plug-compatibility.

This problem would be greatly reduced if digital recording bandwidths were unlimited. However, the above techniques involve the consumption of 10 recording bits per data bit just to produce a less than perfect representation of the input signal.

There are further problems associated with using a computer to analyse digital data streams which have been recorded with a sample clock rate close to the Nyquist rate. Replayed waveforms are then only a close approximation to the input data due to the use of a reconstruction filter following the digital to analogue converter. If a plot were to be made of the data values returned to the digital to analogue converter, the peaks produced would be seriously displaced from their correct positions as a result of the asynchronous nature of the sample clock relative to the data. Clearly this would place a far greater burden on the analysing computer than a perfectly timed and square edged signal.

Another method might be to sample digital data streams using a clock running at, say, ten times the nominal bit rate of the data. This would then produce a digital representation of the waveform, but the edges of the waveform could be displaced from their true positions by up to 10%, placing additional burdens on the clock recovery device. In addition, ten bits do not fit conveniently into either computer bytes or words, which makes analysis by computer difficult. More samples would help, but this would be at the expense of recording duration.

Recorders for recording digital data are usually single channel devices, and recording multiple data channels on them (equivalent to multiple tracks) is usually effected using some form of time division. Since single channel devices only require a single data clock, it follows that if a time division multiplexer is attached to the input of such a recorder, its channel clocks must be related to its output clock. For example, if an eight channel time division multiplexer were to be attached to the input of an 8 Mbyte/sec capable recorder, each of the eight inputs to the time division multiplexer would be expected to source data at 1 Mbyte/sec, combining them sequentially producing an 8 Mbyte/sec stream.

If the time division multiplexer inputs come from analogue to digital converters there would be no problems because a single 8 Mhz source can be used to clock data from the time division multiplexer, and when divided by 8 it can be used as the clocks for the converter and for the input.

Time division is not the only possible multiplexing scheme. For example it would be possible to direct each of the eight input streams to a unique bit of a byte wide input.

Whichever method is used, it is clear that the time division multiplexer must receive data from each of the inputs at equal rates. Plesio synchronous data streams do not meet this requirement and so their rates have to be adjusted, for example as described above.

In summary, single channel digital recorders can be run from an external clock and multi-channel recorders employing multiplexing will then require all channels to run at the same rate.

Special time division multiplexers can be made which have fixed ratios between channels, for example three channels of 2 Mbyte/sec each and two channels of 1 Mbyte/sec each could be combined sequentially to produce a stream at 8 Mbyte/sec.

SUMMARY OF THE INVENTION

According to the present invention, a method of encoding a digital data stream begins with the step of providing a first stream of clock pulses at a first rate, after which a second stream of clock pulses is derived from the first stream at a second rate which is an integer sub-multiple of the first rate and less than the minimum bit rate in the data stream. The data stream is monitored for changes in level, and pulses in the first stream are counted starting with the occurrence of a pulse in the second stream. When a change in level in the data stream is detected during monitoring of the data stream, or when the next pulse in the second stream of clock pulses occurs, the pulse count is captured. Then, a time domain descriptor of the data is produced by combining the count obtained with information as to the direction of the change in level in the data input stream.

The present invention enables representations of digital data streams to be recorded in a narrow bandwidth by coding the digital data with a description of its time domain behaviour. Applying the original coding algorithm to the recorded data in reverse enables a digital output stream to be produced which substantially replicates the original data stream. Alternatively, a computer can be programmed to analyse the recorded data.

The present invention is of particular application to the generation and recording of multiple streams of time domain descriptors derived from a plurality of data streams of different rates as they can be recorded at a common rate and therefore be multiplexed. This is because the descriptors produced in coding are a function of a clock related to the recorder input rate and not the clock rate of the individual input streams. Plesio synchronous data streams can therefore be satisfactorily multiplexed on the same recorder.

The use of a common clock to produce descriptors for multiplexed data streams ensures that the phase relationship of the streams is preserved. Coding is, therefore, purely concerned with the placement of transitions in the time domain of a particular data stream and as such does not require a data derived clock.

The present invention can enable the position of transitions within frequency shift keyed data streams to be described to an accuracy of 1% using only ten recorder bits per data bit. This can be achieved using a highly accurate master clock to determine the positions in time of all transitions in the input data stream, and cumulative errors in determining the positions of these transitions can thereby be avoided.

Although there is an upper limit to the input bit rate, which is determined by the master clock rate, the present invention generally works at all frequencies below this upper limit. This enables data streams of totally unrelated phase and frequency to be recorded in the form of multi-channel recordings on a single channel recorder.

A single master clock used in accordance with the present invention to produce time domain descriptors can also be connected to multiple analogue to digital converters, either directly or in a fixed relationship. This can enable mixtures of frequency shift keyed and analogue channels to be combined by time division whilst maintaining the phase relationship within all of the streams.

The present invention can also provide suppression of spurious noise in the input digital data signals.

Locking the frequency of the single master clock to a frequency standard can also enable recorded data to be replayed at exactly the rate at which it was recorded.

DESCRIPTION OF A PREFERRED EMBODIMENT

An embodiment of the present invention will now be described with reference to the accompanying drawings in which.

Figure 2:
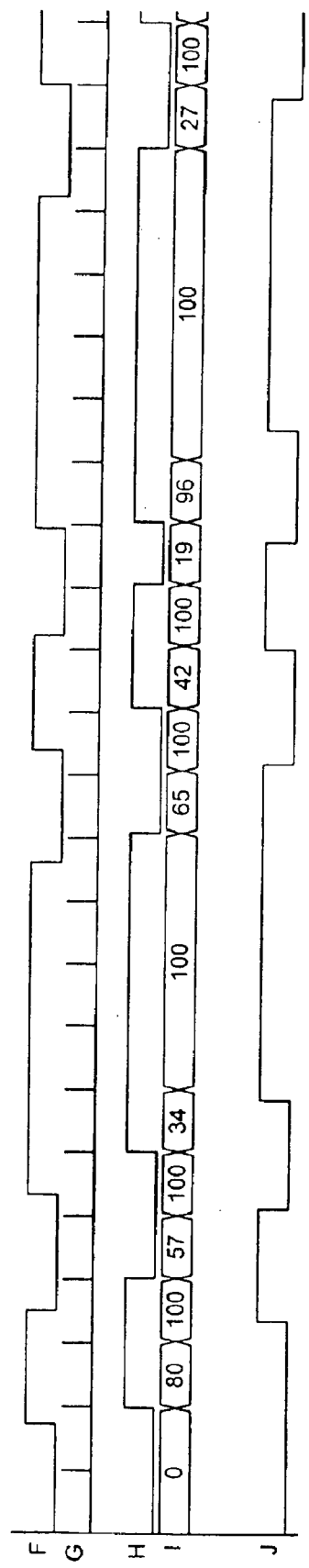
FIG. 2 shows timing charts for a second input data stream unrelated to that of FIG. 1, and the effect of coding it using the present invention.
Figure 3:
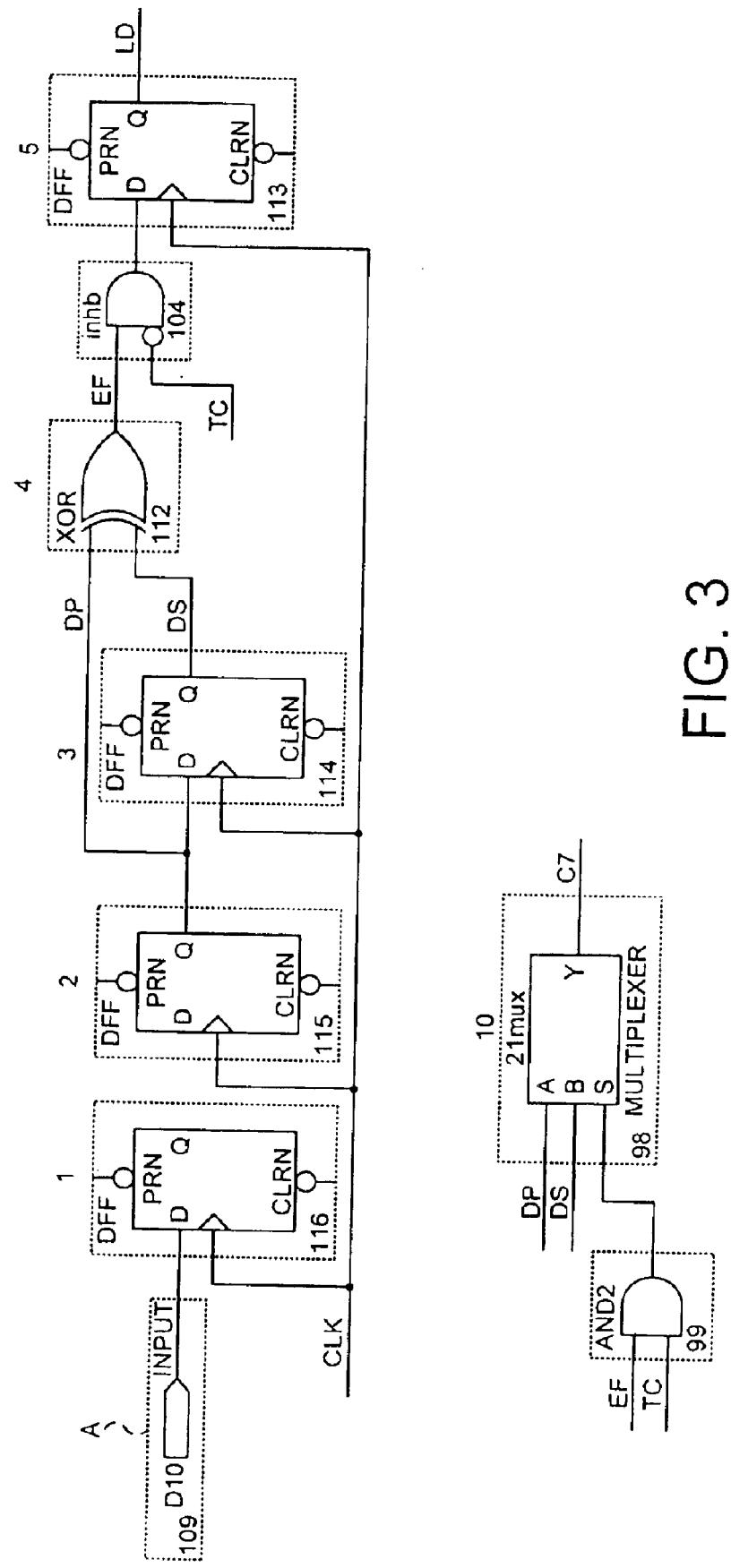
FIG. 3 shows a circuit diagram for a device effecting coding of the data stream of FIG. 1 using a method in accordance with the present invention.
Figure 3:
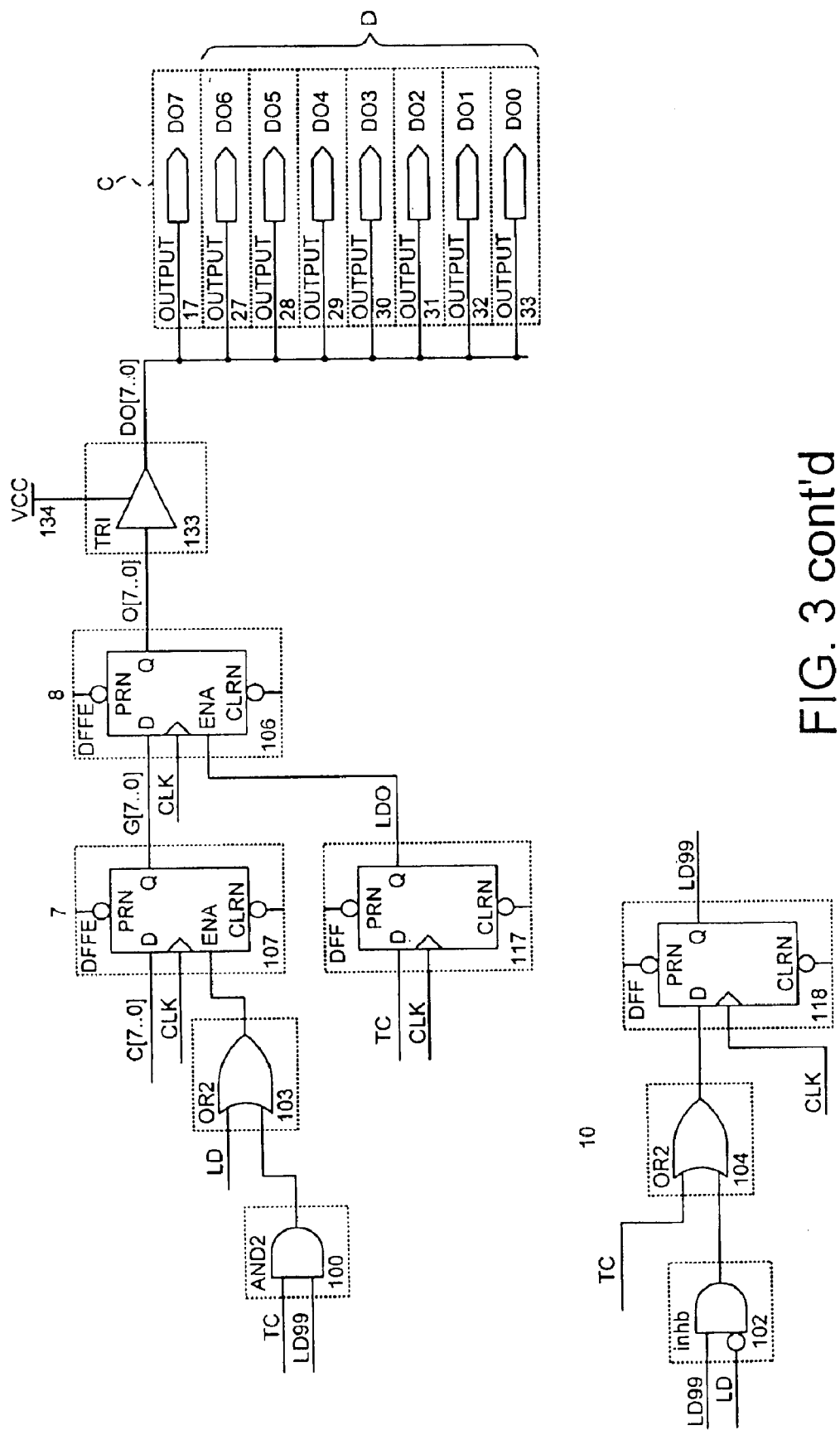
Figure 4:
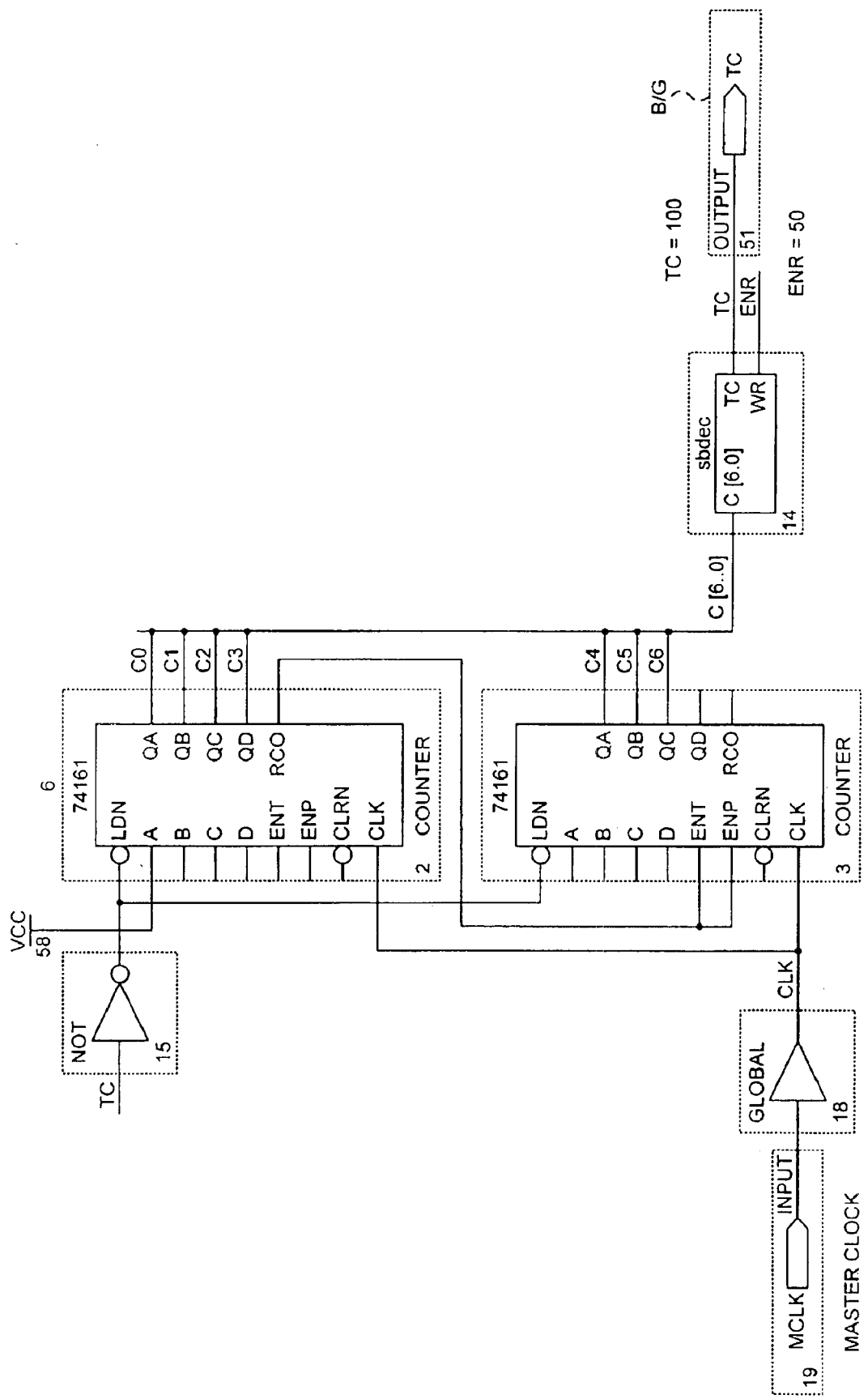
FIG. 4 shows a circuit diagram of counters used to effect coding in accordance with the present invention.
Figure 5:
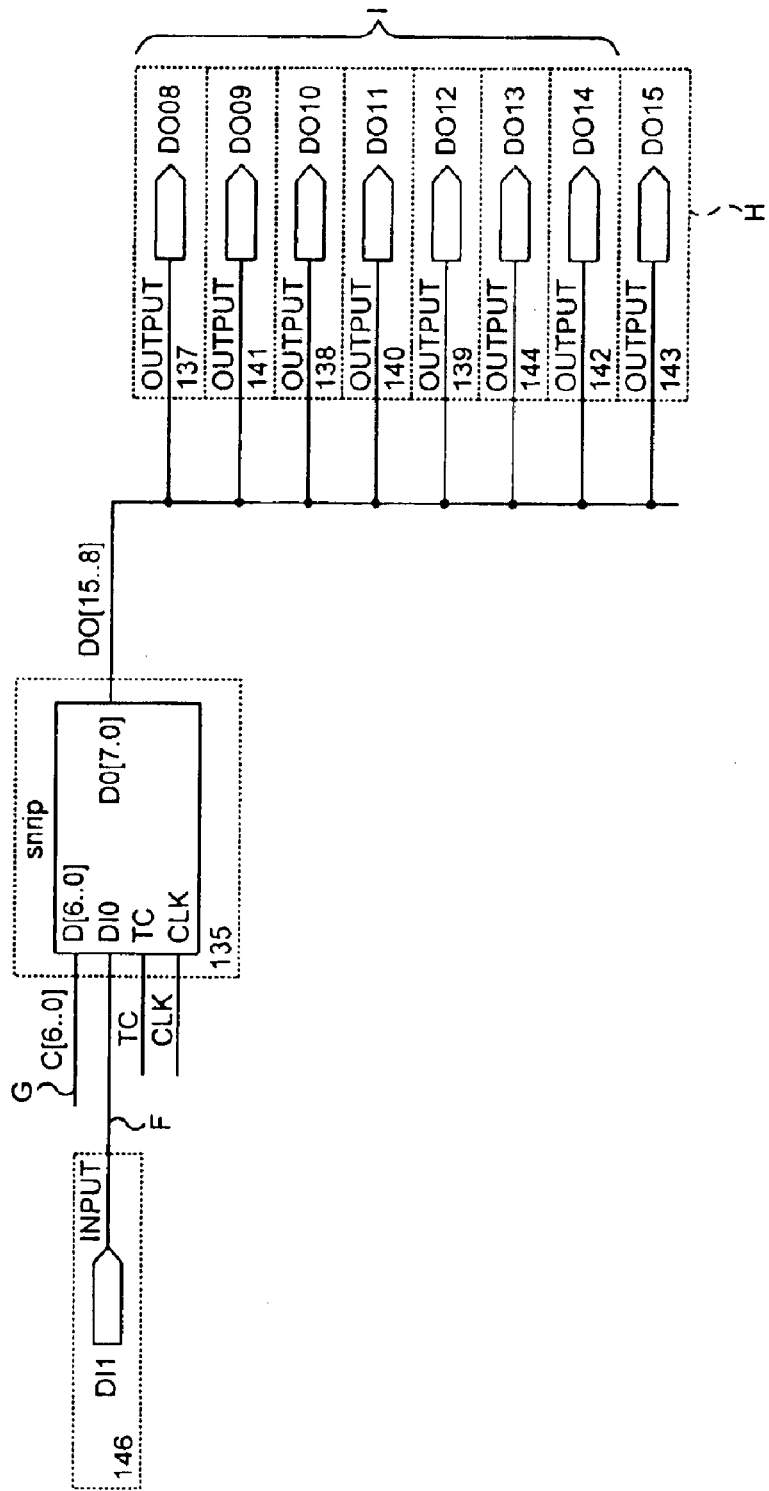
Figure 6:
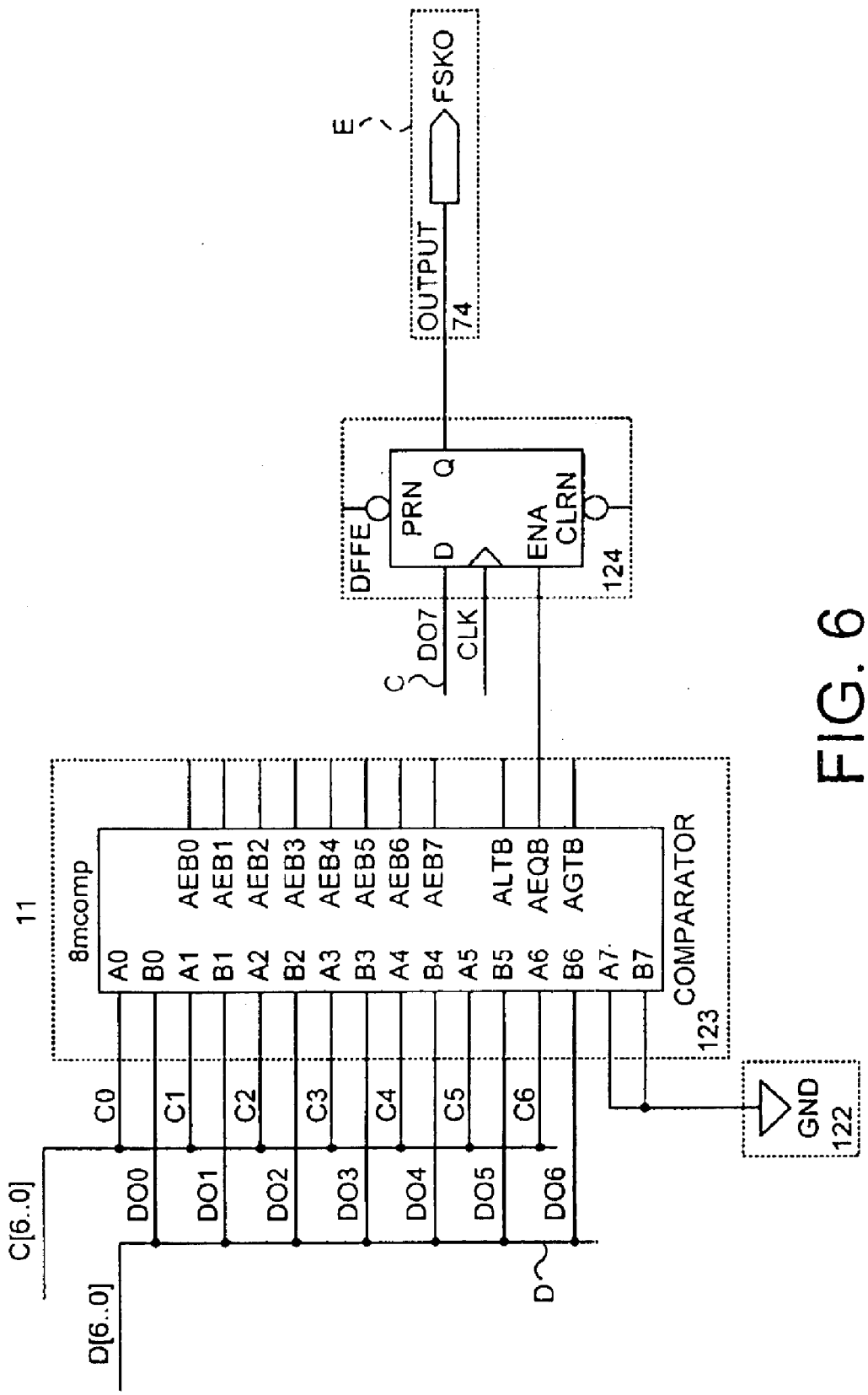
Figure 7:
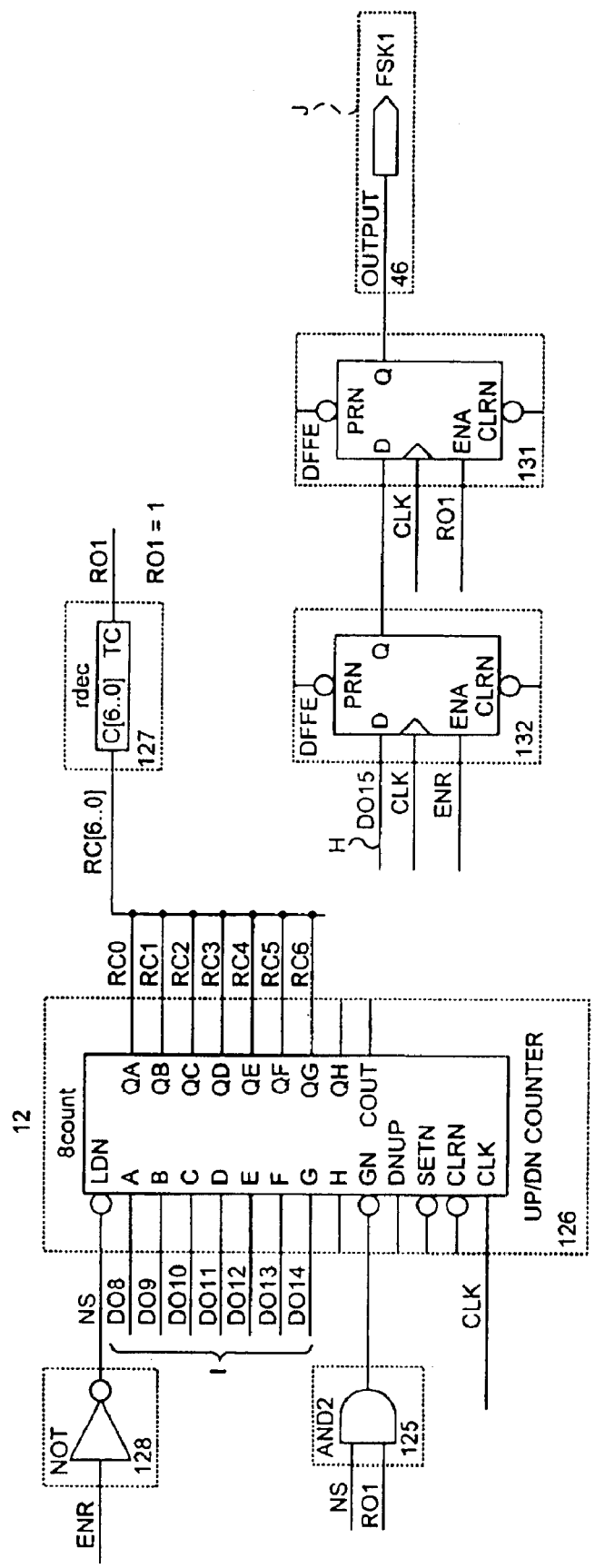

FIG. 5 corresponds to FIG. 3 showing coding of the data stream of FIG. 2, the circuitry of FIG. 3 being reduced to a single symbol;

FIG. 6 shows a circuit for decoding the coded data stream produced with reference to FIG. 3; and FIG. 7 shows a circuit for decoding the coded data stream produced with reference to FIG. 5.

Figure 1:
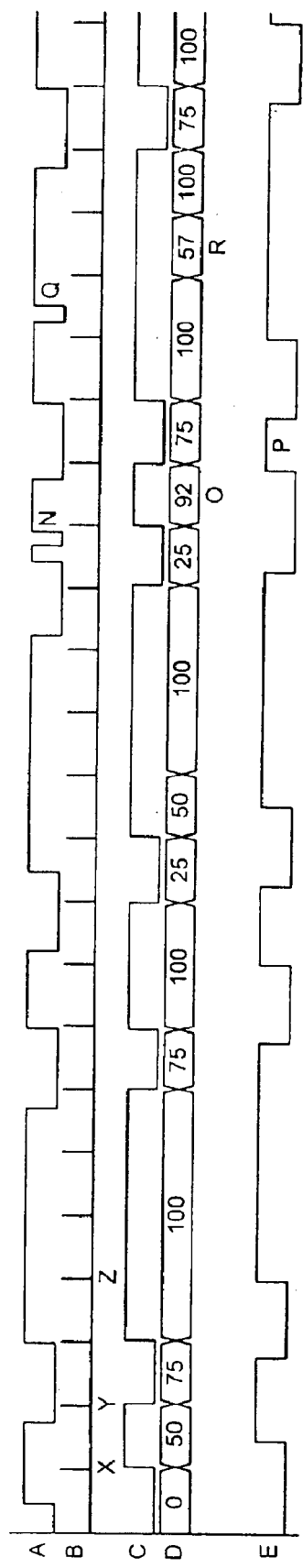
FIG. 1 shows timing charts for a first input data stream and the effect of coding it using the present invention.

A frequency shift keyed signal to be coded in accordance with the present invention is represented by trace A in FIG. 1, and trace B shows times at which time domain descriptors for coding the frequency shift keyed signal are produced (the second clock stream). For ease both of drawing and understanding, this chart has been drawn such that a single bit of the frequency shift keyed signal occupies 125 units of time, with the period between individual time domain descriptors being 100 units.

The time domain descriptors can be contained in a single byte and so can be produced using a bandwidth no more than the minimum bandwidth necessary to record an analogue representation of a digital stream (2.5 bytes for 2 bits). Although this ratio of 125:100 is not critical to the present invention, it is essential that the time between the production of successive time domain descriptors is shorter than the fastest bit time. From a practical point of view it is generally preferred to use binary ratios such as 128:100.

At time Y, as shown in trace B, a time domain descriptor is generated by the device used to effect coding of signal A, the descriptor indicating that 50 units of time after time X, the frequency shift keyed signal A had made a transition from 0 to 1. This is encoded into binary with one bit signifying that the transition was either 1 to 0 or 0 to 1, and the remaining seven bits encoding the time from point X when the transition was detected. The resulting transition direction descriptors are shown as trace C in FIG. 1.

The time element of the descriptor can be derived from a counter clocked from a master clock, which in the present case is running at 125 times the normal bit rate, this being shown as trace D.

When a transition is detected, the current count is transferred to a holding latch together with the post transition state of the input which describes the direction of the transition.

When the counter reaches a terminal count, which in the present case is 100, the eight bits continuing information about the time elapsed since the last transition and the direction of the transition are then captured and the counter is reset and a new search for transitions is started. Due to the range of the counter being restricted to 100, the position of any detected transition can be described by the available seven bits.

The control logic must cater for special cases where no transitions have occurred, such as point Z, where it is sufficient to form the descriptor which is to be recorded from the terminal count and zero for the transition direction.

The descriptors from traces C and D are then converted in a manner to be described with reference to FIGS. 3–6 to produce a bit stream as shown by trace E, which is a reconstruction of the input data.

FIG. 2 shows a second set of traces F, G, H, I and J unrelated to those of FIG. 1 in the course of being processed into descriptors and returned as a bit stream by a different regeneration method from that described with reference to FIG. 6.

In the following description of electronic circuits for effecting coding and decoding of digital signals using a method in accordance with the present invention, letters A–J in FIGS. 3–7 correspond to the corresponding traces in FIGS. 1 and 2.

Referring to FIG. 3, a digital data stream (A) from a frequency shift keyed decoder is applied to the D input of a flip-flop 1. D-type flip-flops 1, 2, 3 and 5 are clocked from a master clock, in the present case 125 times the nominal bit rate of the input data, and they serve to retime the digital stream on to the master clock and minimise meta-stability problems.

An exclusive OR gate 4 finds transitions and sets the D-type flip-flop 5 for a single bit period of the master clock. Setting the flip-flop 5 causes the contents of a seven bit counter 6 between the flip-flop 5 and an eight bit latch 7 to be transferred to the latch 7, together with the direction of any transition which may have occurred in the input signal.

A control block 10 is aware if no transition has been detected, and it permits the terminal count to force a load on to the latch 7 required to cater for the special condition in which no transition occurs. The occurrence of a terminal count plus one clock pulse transfers the contents of the latch 7 to a latch 8 where it may be read at any time up to generation of the next terminal count.

At a time convenient for time division multiplexing, a tri-state buffer 9 is enabled, thereby allowing the descriptor data to pass on to a common buss. As shown in FIG. 3, the tri-state buffer 9 is permanently enabled to allow a continuous display of the descriptors (C and D). When multi-channel recording is effected, a single counter 6 can be shared by all channels.

In one method of converting the time domain descriptors (D) into a digital stream, the count contained in the descriptors is compared with the count produced by the counter 6, using a 7-bit comparator 11. On reaching equality, the transition direction description bit is loaded into a D-type flip-flop, this being shown at (C) in FIG. 6 to produce a regenerated digital signal (E).

Alternatively, a down counter 12 can be loaded with the count (I) in the descriptor and then clocked by the master clock. On reaching a count of one, the transition direction description bit (H) is loaded into a D-type flip-flop and the regenerated digital signal (J) is produced.

In FIGS. 3 and 5, the buss carrying the generated descriptors is used as the input of a regeneration circuit. In practice, where it is required to record the descriptors, and later replay and return them to a digital stream, the output buss would in general be connected to the input of a recorder, and the regeneration circuit would be connected to the recorder output.

If the above comparator technique is used to effect regeneration of a digital signal, the counter 6 would need to be duplicated in the replay circuit, but it could also be shared by multiple channels.

The ability of the present invention to reduce the effects of spurious transitions in the input signals can be seen from FIGS. 1 and 2. Trace A in FIG. 1 includes spurious transitions in the processed frequency shift keyed signal at N and Q. The transition at N causes one false descriptor O and a short regenerated bit P. However, recovery is complete by the following bit. The spurious transition at Q produces an invalid descriptor at R but because the descriptor is decoded as switch to the already established output state, it has no effect on the output.

It is possible with digital recording systems to extract recorded digits via computer compatible media such as archive tapes or directly using a SCSI interface, and this is often the preferred method of analysing captured data rather than replaying it in as a reconstruction of its original form. In the present case, once the recorded time domain descriptors have been transferred to an analysing computer, a search can be made for changes between the direction bits of adjacent descriptors. The time between detected changes can then be recovered by summation of the seven bit time fields of the descriptors, and the number of adjacent bits of the same polarity is then obtained by dividing this summation by the bit period. The original binary sequence can then be reassembled from this.

Digital recorders are data on demand devices which can be arranged to output a unit of data (bit, byte or word) per input clock pulse. By varying the rate of the first stream of clock pulses, and hence the rate of the demand clock, the regenerators will produce a data stream scaled in time equal to the change in ratio of the clock rate of the first clock in record mode to its rate in replay mode. This enables an emulation of the speed up and slow down capabilities of longitudinal recorders to be achieved.

What is claimed is:

1. A method of encoding a digital data stream which comprises the steps of:
   (a) providing a first stream of clock pulses at a first rate;
   (b) deriving a second stream of clock pulses from the first stream at a second rate which is an integer sub-multiple of the first rate and less than a minimum bit rate in the data stream;

(c) monitoring the data stream for changes in level therein;

(d) counting pulses in the first stream starting when a pulse occurs in the second stream;

(e) capturing the pulse count when a change in level in the data stream is detected during monitoring of the data stream according to step (c) or when the next pulse in the second stream of clock pulses occurs; and (f) upon the occurrence of this pulse in the second stream producing a time domain descriptor consisting of a time element derived from the count obtained and a direction change element derived from information as to the direction of the change in level in the digital data stream.

2. A method according to claim 1, wherein the encoded data is recorded before being regenerated.

3. A method according to claim 2, wherein the encoded data streams are multiplexed.

4. A method according to claim 1, wherein analogue data is subjected to digital conversion at a rate derived from the first stream of clock pulses before being encoded.

5. A method according to claim 1, wherein multiple data streams are encoded.

6. A method according to claim 5, wherein the streams are plesio synchronous.

7. A method of decoding data which has been coded by a method according to claim 1, which comprises the steps of generating a digital data signal, monitoring individual time domain descriptors in the encoded data, and changing the level of the digital data signal in response to information as to the direction change element of a particular time domain descriptor at a time determined by the time element of that time domain descriptor.

8. A method according to claim 7, wherein the time element of an individual time domain descriptor is determined by counting clock pulses at the first clock rate starting at a pulse at the second clock rate until the count equals the time element in the individual time descriptor.

9. A method according to claim 7, wherein the time at which changes in level in the regenerated digital signal are effected is determined by counting down the time element of the time domain descriptor to zero at the first clock rate starting from a clock pulse at the second rate.

* * * * *